Dec. 19, 1939.  A. L. JOHNSON  2,183,772
EMERGENCY BRAKE HANDLE FOR AUTOMOBILES
Filed Nov. 25, 1936
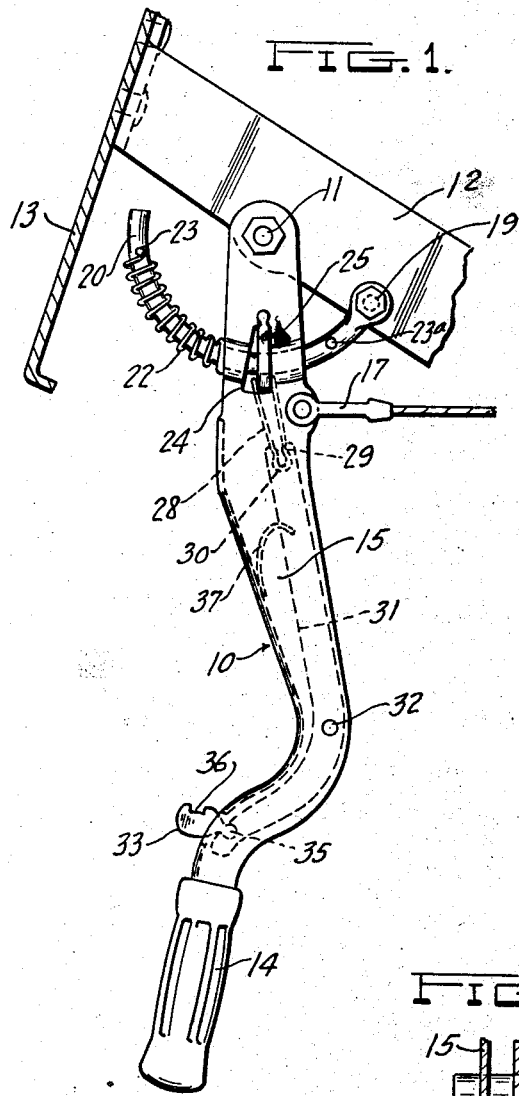
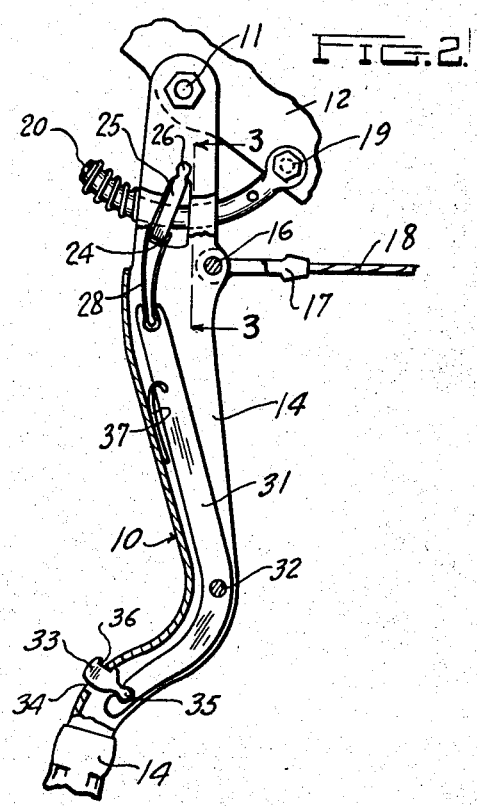
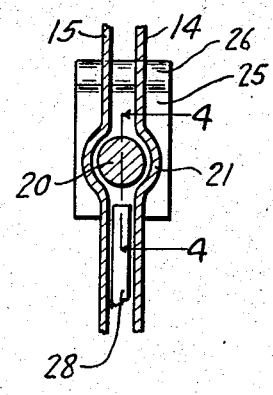
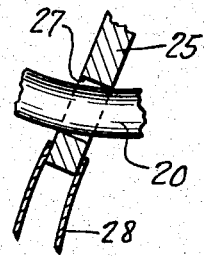
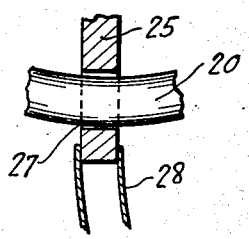
Inventor
Alvin L. Johnson
By
Owen & Owen
Attorneys Patented Dec. 19, 1939

2,183,772

UNITED STATES PATENT OFFICE 2,183,772

EMERGENCY BRAKE HANDLE FOR AUTOMOBILES

Alvin L. Johnson, Toledo, Ohio, assignor to The American Forging & Socket Company, Pontiac, Mich., a corporation of Michigan Application November 25, 1936, Serial No. 112,691

10 Claims. (Cl. 74—531)

This invention relates to brake control devices for automobiles but more particularly to the control of the hand operated emergency brake.

An object is to produce a single and inexpensive hand operated emergency brake lever for automobiles whereby, by a single manual control on the lever, it may be conveniently changed either to maintain the brake set to whatever extent the handle is temporarily moved, or to set the brake only while force is applied to the handle.

Other objects are to produce a hand operated emergency brake lever having the new and improved features of construction, arrangement and operation hereinafter described.

One embodiment of the invention is shown on the accompanying drawing, in which

Figure 1 is a side elevation of an emergency hand brake lever pivoted back of the instrument board of an automobile;

Fig. 2 is a longitudinal sectional elevation of the lever shown in Fig. 1, showing the locking member in its cramped or locking position.

Fig. 3 is an enlarged sectional view on the line 3—3 of Fig. 2;

Fig. 4 is a fragmentary sectional view showing the locking member in locking position;

Fig. 5 is a fragmentary sectional view showing the locking member in its unlocked position permitting free movement of the hand lever with respect to the sector.

The illustrated embodiment of the invention comprises a hand operated emergency brake lever 10 which is pivoted at 11 to a bracket 12 mounted in stationary position back of the instrument board 13. It will be apparent that the lever depends from the bracket 12, the lower end having a hand grip 14 to be engaged for actuating the lever. In this instance, the lever is formed of a stamping and is of U-shape in cross section for the greater portion of its length providing opposed side walls 14 and 15. Pivoted to the lever 10 at 16 between the sides 14 and 15 thereof is a rod 17 from which a cable 18 leads to the brake.

Secured at 19 to the bracket 12 is a bar or rod 20 in the form of a sector which extends through the lever 10 between the walls 14 and 15, the latter being bowed outwardly at 21 as shown on Fig. 3. A coil spring 22 encircles the sector 20, bears at one end against a pin 23, at the opposite end against the lever 10 for normally holding the latter in non-braking position, shown in Fig. 1, a pin 23ª limits the swinging movement of the lever in non-braking direction.

Mounted adjacent the upper end of the lever 10 with side edge portions disposed in pie-shaped openings 24 in the walls 14 and 15, is a locking member 25 having a knob-like upper end 26 fitting into a similarly shaped opening in the lever, thereby providing a pivotal mounting for the upper end of the locking member. This mounting of the locking member enables it to rock laterally between opposite sides of the openings 24. The locking member 25 has an opening 27 which is slightly larger than and through which the rod 20 extends. The lower end of the locking member 25 extends beyond the rod 20 and is engaged by a leaf spring 28 in the form of a hairpin, the locking member being received by the free ends thereof. The looped end of the spring 28 has a restricted neck 29 and this end fits into a similarly shaped opening 30 in the upper end of an arm 31. The arm 31 fits between the sides 14 and 15 of the lever and the lower portion is pivoted at 32 and the lower portion is bent forwardly as shown to conform to the shape of the lever 10. Rocking of the arm 31 is accomplished by a control member 33 which is disposed transversely of the lever 10 with the outer portion projecting through an opening 34. The inner end has a knob-like portion 35 fitting into a similarly shaped opening in the arm 31. The upper surface of the member 33 is notched at 36 so that when the control member is forced inwardly it can engage the side of the opening 34 to hold the arm in position. A leaf spring 37 constantly urges the arm 31 in a clockwise direction to hold the locking member 25 normally in unlocked position.

When the locking member 25 is in its right-hand position, as shown in Fig. 1, the brake is released and the handle is free to move along the sector rod 20. This might be termed the normal position of the locking member 25 since the spring 37 urges the arm 31 to such position. By pressing against the control member 33 and forcing the same inwardly to the position indicated in Fig. 2, the arm 31 is rocked in a counter-clockwise direction thereby through the spring 28 moving the locking member 25 to the left as shown in Fig. 2 in order to bias the locking member 25 to cramp it upon the sector rod 20 to prevent movement of the lever 10 in brake releasing direction. By releasing the control member 33 and exerting a slight pull on the lever to relieve the stress upon the locking member 25, the latter is moved to the position shown in Fig. 1.

It will be seen from the above description that the construction is such that it allows the emergency brake to be set to the required degree and hold it in the exact position in which it is set. This is particularly advantageous in that it militates against excessive strain on the brake parts as well as the operator, thereby avoiding difficulties not infrequently encountered with the ordinary ratchet control. It will further be apparent that this structure enables the brake to be readily and conveniently converted to a running brake so that in the operation of the automobile the operator can exert as much or as little braking stress as the conditions require. The control member 33 is conveniently positioned so that it can be readily operated by the thumb of the operator so that release of the brake can be effected without difficulty.

It is to be understood that numerous changes in details of construction, arrangement and operation may be effected without departing from the spirit of the invention, especially as defined in the appended claims.

What I claim is:

1. In combination with a hand lever for an emergency brake, a stationary rod along which said lever is movable, a locking member pivoted to said lever and having an opening through which said rod passes, said locking member being adapted in one position to enable the lever to move freely with respect to said rod and in another position to cramp against said rod to lock the lever against movement to brake releasing position, a pivotally mounted arm carried by said lever, a yielding connection between one end of said arm and said locking member, and means engageable with the opposite end of said arm for actuating and retaining same in the adjusted position.

2. In an automobile having an emergency brake, a hand lever for operating said brake, a movable detent pivoted to said lever about an axis disposed transversely of the lever to latch same against movement thereof in brake releasing direction, a stationary member engageable by said detent and extending through an opening in the detent, an arm extending longitudinally of said lever, a pivotal connection between said arm and lever enabling rocking movements of said arm about an axis transversely of the lever, spring means carried by an end portion of said arm and providing an operative connection between said arm and said detent, said arm and lever being disposed one within the other, and manual means on said arm for actuating same.

3. In a hand lever for an emergency brake, a lever body pivotally mounted at one end and having opposed side walls, a stationary segmental member extending between the sides of said body, a locking member pivoted at one end to said body and having an opening receiving said segmental member, means limiting the swinging movement of said locking member, a pivotally mounted arm carried by said body for swinging said locking member to cramp same against or free same from said segmental member, and means to retain the locking member in either of said positions.

4. In combination with a hand lever for an emergency brake, a stationary rod along which said lever is movable, said lever having a substantially sector-shaped opening adjacent said rod, a cockable locking member pivotally mounted at one end at the small end of said opening, said locking member having an opening through which said rod passes, a pivotally mounted arm carried by said lever and movable independently thereof, and spring means providing a connection between one end of said arm and the opposite end of said locking member.

5. In combination with a hand lever for an emergency brake, a stationary rod along which said lever is movable, said lever having a substantially sector-shaped opening adjacent said rod, a cockable locking member pivotally mounted at one end at the small end of said opening, said locking member having an opening through which said rod passes and being rockable to and from a position in which it binds on said rod, a pivotally mounted arm carried by said lever and movable independently thereof, an operative connection between said arm and locking member, and spring means reacting against said arm and locking member to urge the latter away from binding position.

6. Means as set forth in claim 5 in which said operative connection between the arm and locking member includes a resilient portion yieldable when either said arm or locking member is urged in either direction.

7. In combination with a pivoted hand lever for an emergency brake, a stationary rod along which said lever is movable, said lever having an opening adjacent said rod, a washer-like member tiltably mounted in said opening for movement about an axis parallel to the axis of said lever, said member being apertured to receive said rod and being adapted in one position to enable free movement of the lever along the rod and in another position to cramp against the rod to lock the lever against movement to brake releasing position, and means carried by said lever for tilting said washer-like member, said tilting means including spring means so constructed and arranged that release of the washer-like member from cramped position is effected only after imparting a slight movement to said lever to relieve the stress on said member thereby to enable said spring means to rock said member away from cramped position.

8. In combination with a pivoted hand lever for an emergency brake, a stationary rod along which said lever is movable, said lever having an opening adjacent said rod, a washer-like member tiltably mounted in said opening for movement about an axis parallel to the axis of said lever, said member being apertured to receive said rod and being adapted in one position to enable free movement of the lever along the rod and in another position to cramp against the rod to lock the lever against movement to brake releasing position, and means carried by said lever for tilting said washer-like member, said tilting means including a substantially hair-pin shaped spring engaging said washer-like member.

9. In combination with a hand lever for an emergency brake, a segmental member along which said lever is movable, a rockable locking member carried by said lever and releasably engaging said segmental member for locking the lever against brake-releasing movement, an actuating arm carried by said lever and movable independently thereof, and a spring interposed between an end of said arm and locking member and providing a direct connection therebetween for rocking the latter to and from locking position, said spring constituting a substantially U-shaped spring, a portion of the locking member being disposed between the free ends of the spring and the opposite end of the spring being carried by said arm.

10. In combination with a pivoted hand lever for an emergency brake, a stationary sector along which said lever is movable, a cockable locking member for holding said lever in adjusted position, said member being apertured to receive said sector and being adapted in one position to enable free movement of the lever along the sector and in another position to cramp against the sector to hold the lever against movement to brake releasing position, and means for tilting said locking member including means effective only upon movement of said lever sufficiently to release the stress upon the locking member for rocking same away from cramped position.

ALVIN L. JOHNSON.